United States Patent
Bimberg et al.

(10) Patent No.: US 11,397,623 B2
(45) Date of Patent: Jul. 26, 2022

(54) DATA STORAGE DEVICE LOAD SHARING

(71) Applicant: Seagate Technology LLC, Cupertino, CA (US)

(72) Inventors: Darrel R. Bimberg, Watertown, MN (US); Christopher L. Hill, Apple Valley, MN (US); Paul W. Burnett, Savage, MN (US)

(73) Assignee: Seagate Technology LLC, Fremont, CA (US)

( * ) Notice: Subject to any disclaimer, the term of this patent is extended or adjusted under 35 U.S.C. 154(b) by 210 days.

(21) Appl. No.: 16/824,420

(22) Filed: Mar. 19, 2020

(65) Prior Publication Data

US 2021/0294669 A1    Sep. 23, 2021

(51) Int. Cl.
G06F 9/50    (2006.01)
G06F 11/30   (2006.01)
G06F 1/3234  (2019.01)
G06F 3/06    (2006.01)

(52) U.S. Cl.
CPC .......... *G06F 9/5094* (2013.01); *G06F 1/3268* (2013.01); *G06F 3/0625* (2013.01); *G06F 3/0653* (2013.01); *G06F 3/0674* (2013.01); *G06F 9/5016* (2013.01); *G06F 11/3062* (2013.01); *G06F 2209/508* (2013.01); *G06F 2209/5022* (2013.01)

(58) Field of Classification Search
CPC .. G06F 3/0674; G06F 3/0653; G06F 11/3062; H02M 1/08; H03K 7/08
See application file for complete search history.

(56) References Cited

U.S. PATENT DOCUMENTS

| | | | |
|---|---|---|---|
| 5,181,169 A | 1/1993 | Murugan | |
| 5,998,885 A | 12/1999 | Tamor et al. | |
| 6,236,582 B1* | 5/2001 | Jalaleddine | H02J 1/001 363/72 |
| 6,320,358 B2 | 11/2001 | Miller | |
| 6,344,985 B1 | 2/2002 | Akerson | |
| 6,469,858 B1* | 10/2002 | Tsuyuguchi | G11B 19/20 360/272 |
| 6,496,393 B1 | 12/2002 | Patwardhan | |
| 6,885,173 B2 | 4/2005 | Lee | |
| 7,012,822 B2 | 3/2006 | Zhu et al. | |
| 7,768,254 B1* | 8/2010 | Michael | G06F 1/28 324/142 |
| 7,936,083 B2 | 5/2011 | Stancu et al. | |
| 9,088,175 B2 | 7/2015 | Fang | |

(Continued)

FOREIGN PATENT DOCUMENTS

| CN | 110515446 | 11/2019 |
|---|---|---|
| KR | 10-2018-0126933 | 11/2018 |

OTHER PUBLICATIONS

European Patent Office, Extended European Search Report issued in 20217589.0, dated Jun. 24, 2021.

*Primary Examiner* — Vincent H Tran
(74) *Attorney, Agent, or Firm* — Faegre Drinker Biddle & Reath LLP

(57) ABSTRACT

A data storage device includes load-sharing circuitry configured to utilize a threshold for distributing current from multiple sources and modify the threshold in response to a calculated power. The data storage device further includes power calculating circuitry configured to calculate power used from the multiple sources for use by the load-sharing circuitry.

20 Claims, 5 Drawing Sheets

(56) References Cited

U.S. PATENT DOCUMENTS

| | | | |
|---|---|---|---|
| 9,240,742 B1 | 1/2016 | Erickson et al. | |
| 9,244,519 B1 | 1/2016 | Ellis et al. | |
| 9,690,346 B1 * | 6/2017 | Bucher, II | G06F 1/28 |
| 9,899,834 B1 * | 2/2018 | Mayo | G11C 5/143 |
| 10,892,637 B2 * | 1/2021 | Lu | H02J 9/061 |
| 2004/0189094 A1 | 9/2004 | Hori | |
| 2005/0102539 A1 * | 5/2005 | Hepner | G06F 11/3031 |
| | | | 713/300 |
| 2005/0135124 A1 | 6/2005 | Diaz Guerra Mora et al. | |
| 2008/0073975 A1 * | 3/2008 | Wight | G06F 13/385 |
| | | | 307/32 |
| 2010/0001585 A1 | 1/2010 | Nagata | |
| 2012/0262133 A1 | 10/2012 | Martinelli | |
| 2013/0097413 A1 * | 4/2013 | Wu | G06F 1/3203 |
| | | | 713/2 |
| 2014/0114494 A1 * | 4/2014 | Lillis | H02J 4/00 |
| | | | 700/295 |
| 2015/0288220 A1 * | 10/2015 | Gurunathan | H02J 3/381 |
| | | | 307/65 |
| 2017/0005571 A1 * | 1/2017 | Wang | G06F 13/4081 |

\* cited by examiner

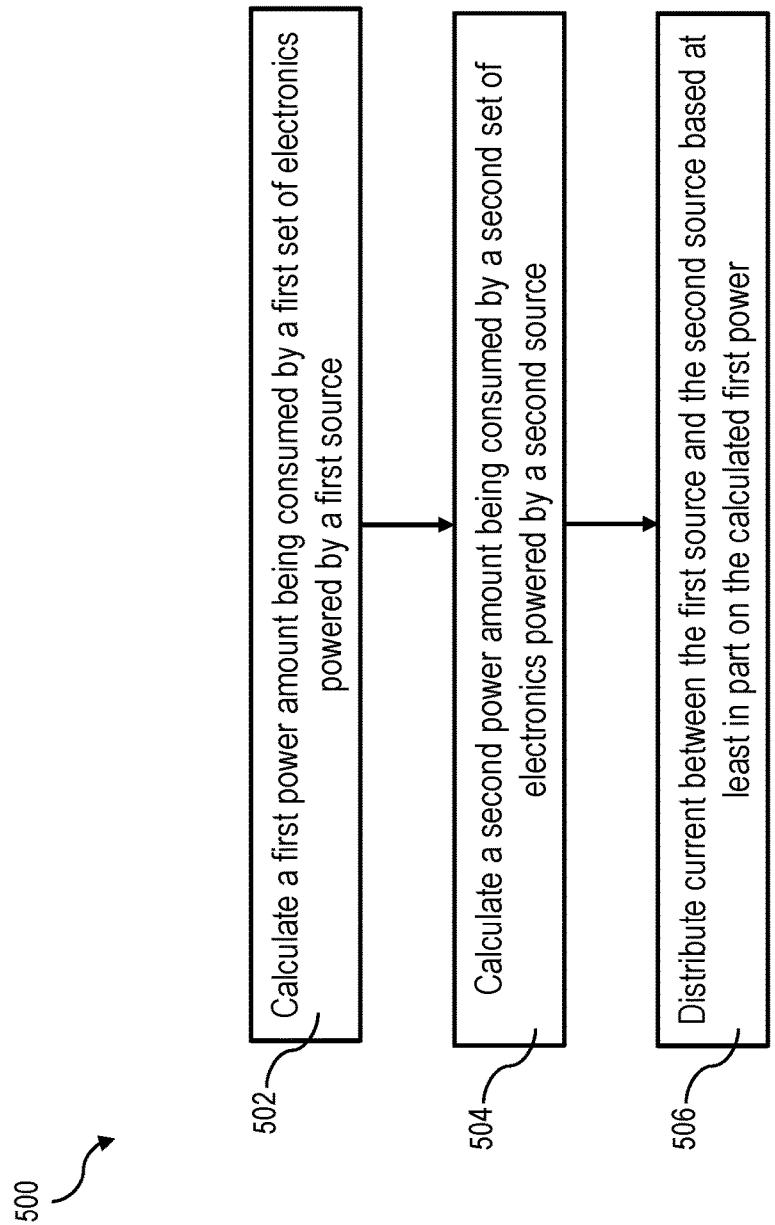

DATA STORAGE DEVICE LOAD SHARING

SUMMARY

In certain embodiments, a data storage device includes load-sharing circuitry configured to utilize a threshold for distributing current from multiple sources and modify the threshold in response to a calculated power. The data storage device further includes power calculating circuitry configured to calculate power used from the multiple sources for use by the load-sharing circuitry.

In certain embodiments, a method includes calculating a first power amount being consumed by a first set of electronics powered by a first source, calculating a second power amount being consumed by a second set of electronics powered by a second source, and distributing current between the first source and the second source based at least in part on the calculated first power.

In certain embodiments, an electronic fuse includes a first input configured to receive a first voltage signal from a first power source, a second input configured to receive a second voltage signal from a second power source, an output configured to communicate a first analog signal indicative of a first current being inputted to a data storage device from the first voltage signal, a single- or bi-directional converter circuit configured to distribute current—based at least in part on a control signal, from the first power source to a load coupled to the second power source—and a converter circuit configured to receive a command signal that is responsive to a calculated power that is based at least in part on the first analog signal and the first voltage signal.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 5 depicts a block diagram of steps of a method for load sharing within data storage devices, in accordance with certain embodiments of the present disclosure.

Figure 1:
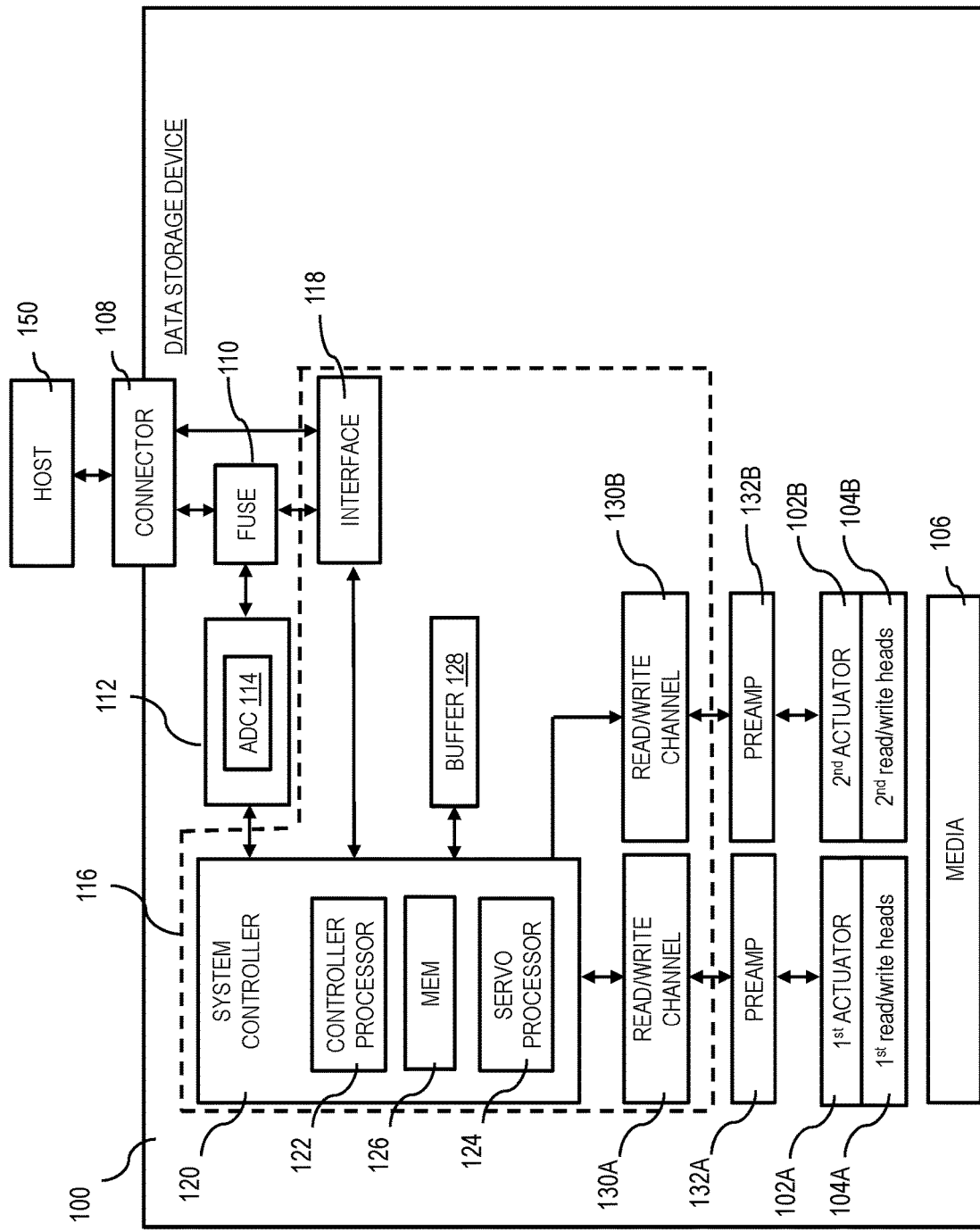
FIG. 1 shows a schematic of a data storage device, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

The present disclosure describes systems, methods, and devices for distributing power use in data storage devices such as hard disk drives. Hard disk drives receive power from multiple power sources. The electrical current from the power sources may be provided to multiple loads, such as motors and integrated circuits, among other devices. When the demand for current from one of the power sources increases, current from another of the power sources may be provided to meet the increased demand for current. However, it may be more efficient for one power source to provide its current to another but not vice versa. Certain embodiments of the present disclosure describe approaches for efficiently sharing current between or among loads from multiple power sources.

FIG. 1 shows a schematic of a data storage device 100 (e.g., a hard disk drive) that includes a first actuator 102A and a second actuator 102B each coupled to one or more read/write heads 104A and 104B to provide concurrent access to magnetic recording media 106. In certain embodiments, the multiple actuators 102A and 102B share a common pivot axis and are positioned in a stacked arrangement. In such embodiments, the read/write heads 104A coupled to the first actuator 102A access different surfaces of the magnetic recording media 106 than the read/write heads 104B coupled to the second actuator 102B. In other embodiments, the multiple actuators 102A and 102B have separate pivot axes. In such embodiments, the read/write heads 104A coupled to the first actuator 102A may access the same magnetic recording media 106 as the read/write heads 104B coupled to the second actuator 102B. Although two actuators for the data storage device 100 are shown in FIG. 1, in certain embodiments the data storage device 100 may have a single actuator or more than two actuators.

The data storage device 100 includes an electrical connector 108 such as a standardized electrical connector (e.g., Serial Advanced Technology Attachment (SATA) electrical connector or a Serial Attached Small Computer System Interface (SAS) electrical connector). The electrical connector 108 can include various pins that communicate electrical signals between the data storage device 100 and a host 150 (e.g., a server, laptop).

The data storage device 100 also includes a fuse 110. The fuse 110 is electrically coupled between the electrical connector 108 and the rest of the electronics of the data storage device 100. The fuse 110 can be used to help prevent power from undesirably entering the data storage device 100 or leaking from the data storage device 100. For example, the electronics of the data storage device 100 may not be designed to handle low voltage levels or may be more error prone at low voltage levels. As such, the fuse 110 can help prevent power from flowing to the data storage device's electronics until the input voltage reaches a certain threshold. This function can be helpful when power begins to ramp up when the data storage device 100 is initially turned on. As another example, in the event of a power loss of the data storage device 100, the fuse 110 can help prevent power within the data storage device 100 (e.g., power intended for emergency caching data or retracting an actuator in a hard disk drive) from leaking out of the data storage device 100 via the electrical connector 108. In certain embodiments, the fuse 110 is an electronic fuse (sometimes referred to as an eFuse), which is an integrated circuit with circuitry for carrying out the above-described functions. In certain embodiments, as will be described in more detail below, the fuse 110 can be programmable such that the threshold (e.g., a voltage threshold) at which it permits power to flow to electronics can be modified. In certain embodiments, the fuse 110 is only coupled to pins of the electrical connector 108 that output power signals. For example, data commands and data-transferring signals may not pass through the fuse 110 and instead may be communicated directly between the electrical connector 108 and an input/output interface of the data storage device 100.

The data storage device 100 also includes a power device 112 that includes an analog-to-digital converter 114. The power device 112 is electrically coupled between the fuse 110 and a system on a chip ("SOC") 116 (shown in dashed lines in FIG. 1). As will be described in more detail below, the analog-to-digital converter 114 converts an analog electrical signal (e.g., a voltage signal) to a digital signal that can be sampled or otherwise used by the SOC 116 and one or more of its components. In addition to having the analog-to-digital converter 114, the power device 112 is configured to help manage power distribution to the various electronics of the data storage device 100.

The SOC 116 may be an integrated circuit such as an application-specific integrated circuit ("ASIC") and field-programmable gate array ("FPGA") that includes instructions for carrying out various functions of the data storage device 100.

The SOC 116 can include an interface 118 (e.g., an input/output interface) for transferring data to and from the data storage device 100. For example, the interface 118, among other features, can be communicatively coupled between the host 150 (e.g., a data storage system such as a server or laptop) and the read/write heads 104A and 1046 to facilitate communication between the read/write heads 104A and 1046 and the host 150.

The SOC 116 includes a system controller 120 (hereinafter referred to simply as the "controller") with a controller processor 122 (e.g., a microprocessor), a servo processor 124 (e.g., a microprocessor), and memory 126 (e.g., volatile memory such as a dynamic random access memory ("DRAM"), static random access memory ("SRAM"), and the like). In certain embodiments, a separate respective bank of memory is dedicated to the controller processor 122 and to the servo processor 124, although the memory 126 can be shared among processors of the controller 120.

The controller 120 can be coupled to and control access to a buffer 128, which can temporarily store data associated with read commands and write commands. The buffer 128 can be a volatile memory, such as DRAM, SRAM, and the like. Further, the controller 120 can be coupled to respective read/write channels 130A and 130B.

The controller processor 122 is configured to, among other things, manage access to the magnetic recording media 106. For example, the controller processor 122 may manage dataflow operations, manage access to the buffer 128, and control the respective read/write channels 130A and 130B.

The servo processor 124 is configured to, among other things, control operations of the respective first and second actuators 102A and 102B (and any microactuators coupled to the first and second actuators 102A and 102B) such as track seeking operations, track following operations, and track settling operations. In certain embodiments, the servo processor 124 controls operations of respective pre-amplifiers 132A and 132B, which provide signals to the read/write heads 104A and 104B for writing magnetic transitions to the magnetic recording media 106 and receive signals from the read/write heads 104A and 104B in response to detecting magnetic transitions on the magnetic recording media 106.

The controller 120 also controls scheduling of data transfer commands (e.g., read commands or write commands). During operation, the data storage device 100 receives various data transfer commands from the host 150. A given data transfer command may be directed to a particular actuator (e.g., a read command for data accessible by the first actuator 102A, or a write command to write data to media accessible by the second actuator 102B). Data received from the host 150 can be encoded or otherwise processed by one of the respective read/write channels 130A and 130B and eventually stored to the magnetic recording media 106 via one of the read/write heads 104A or 104B coupled to the respective first actuator 102A and the second actuator 102B. Data associated with a read command may be retrieved from the magnetic recording media 106 and stored the buffer 128. Such data is then transferred to the host 150 by the interface 118 via the controller 120.

The controller 120 is also configured to control operations of the data storage device's spindle motor (not shown). For example, the controller 120 can control the speed of the spindle motor, when the spindle motor spins up and spins down, and different power modes (e.g., power-saving mode) of the spindle motor.

Figure 2:
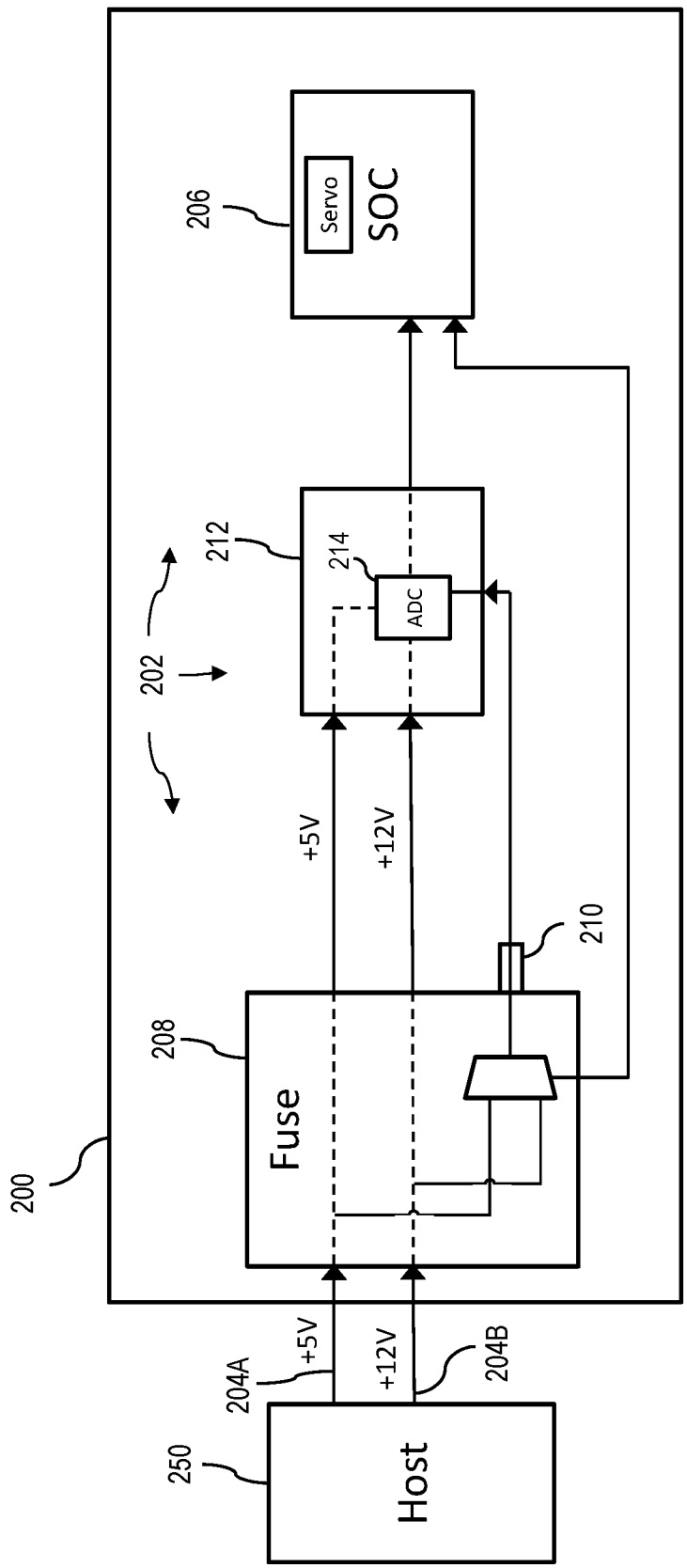
FIG. 2 shows a schematic of a power-calculating circuit, in accordance with certain embodiments of the present disclosure.

FIG. 2 shows a data storage device 200 with a power-calculating circuit 202 (hereinafter referred to simply as the "circuit 202") that can be used to calculate the total power usage of the data storage device 200. For simplicity of explanation, the data storage device 200 is not shown in FIG. 2 with all of the features described above with respect to FIG. 1 and vice versa. However, it is appreciated that the data storage device 200 could include each of the features shown and described with respect to FIG. 1 but not necessarily shown in FIG. 2.

In short, the power-calculating circuit 202 includes features for measuring the voltage being inputted to the data storage device 200 and for measuring the current being consumed by the electronics of the data storage device 200. As such, the measured voltage and current can be used to calculate the total power—among other things—being used by the data storage device 200. The calculated power can be communicated to a host 250, which can use the calculated power to manage power usage across data storage devices controlled by the host 250.

The host 250 is shown as providing two power sources (i.e., a first power source 204A and a second power source 204B) to the data storage device 200. In certain embodiments, the two power sources can have different voltages. For example, the first power source 204A can be a 5-volt power source and the second power source 204B can be a 12-volt power source. The first power source 204A can power components of the data storage device 200 such as an SOC 206 and miscellaneous lower-power electronics while the second power source 204B can power components of the data storage device 200 such as the spindle motor, microactuators, and the voice coil motors that rotate actuators coupled to read/write heads.

The signals from both the first power source 204A and the second power source 204B can be inputted to a fuse 208. As mentioned above with respect to the fuse 110 of FIG. 1, the fuse 208 can help prevent low voltage levels from reaching the electronics of the data storage device 200 or power from leaking out of the data storage device 200.

In certain embodiments, the fuse 208 is also configured to output an analog signal that is indicative of the current being used by electronics of the data storage device 200. For example, the outputted analog signal from the fuse 208 can be indicative of the current being used by (or drawn by) the electronics powered by the first power source 204A (e.g., electronics on a first power rail) and by the electronics powered by the second power source 204B (e.g., electronics on a second power rail). In certain embodiments, the outputted analog signal has a voltage that is proportional to the current being used by the electronics of the data storage device 200.

In certain embodiments, the fuse 208 shown in FIG. 2 includes only a single output pin 210. As such, the fuse 208 can be arranged to interleave respective signals indicative of the current being used by the electronics powered by the first power source 204A (e.g., from the first input voltage) and by the electronics powered by the second power source 204B (e.g., from the second input voltage). In certain embodiments, the output pin 210 includes or is coupled to a series resistor, which can be used to adjust the gain or scaling of the respective signals indicative of the current being used by the electronics powered by the first power source 204A (e.g., from the first input voltage) and by the electronics powered by the second power source 204B (e.g., from the second input voltage).

In certain embodiments, the analog signal—that is indicative of the current being used by the electronics of the data storage device 200—is outputted from the fuse 208 and inputted to a power device 212. The analog-to-digital converter 214 of the power device 212 can convert the analog signal to a digital signal that can be used by the SOC 206. In certain embodiments, the power device 212 includes a scaling module that scales down the amplitude of the signal being inputted to the SOC 206.

After receiving the digital signal indicative of the current being used by the electronics of the data storage device 200, the SOC 206 uses the digital signal and the input voltage (e.g., 5 volts, 12 volts, or as measured by hardware of the data storage device 200) to calculate the actual power being used by the entire data storage device 200 (e.g., total power used of the data storage device 200). For example, the power can be calculated by multiplying the input voltage by the known current, which is based on the digital signal indicative of the current being consumed by the electronics of the data storage device 200. In certain embodiments, the input voltage is measured by the analog-to-digital converter 214 of the power device 212. In certain embodiments, a controller (e.g., via a servo processor) calculates the power. For example, the servo processor may sample the measured voltages and current from the analog-to-digital converter 214 and then calculate power. The servo processor may—from a control path or signal path perspective—be closest to the analog-to-digital converter 214 compared to other processors of the SOC 206.

As described above, the SOC 206 can calculate the total power being consumed by electronics of the data storage device 200 in real time by sampling the digital signal from the power device 212 and using the input voltages. However, other types of calculations can be made. For example, the SOC 206 can separately calculate the power being consumed by the electronics powered by first power source 204A and the power being consumed by the electronics powered by second power source 204B. The two power calculations can then be added together to calculate the total power usage of the data storage device 200. As another example, the SOC 206 can calculate and timestamp the minimum and maximum power usage. As another example, the SOC 206 can calculate average power usage across a given period of time (e.g., on the order of seconds to minutes to hours) that can initially be pre-determined and later adjusted (e.g., internally or by a command from the host 250).

In certain embodiments, the various power calculations can be stored within the data storage device 200. For example, memory can store the results of the various power calculations. As will be described in more detail below, the power calculations can be used to determine when power is distributed from one power source to electronics powered by another power source.

Figure 3:
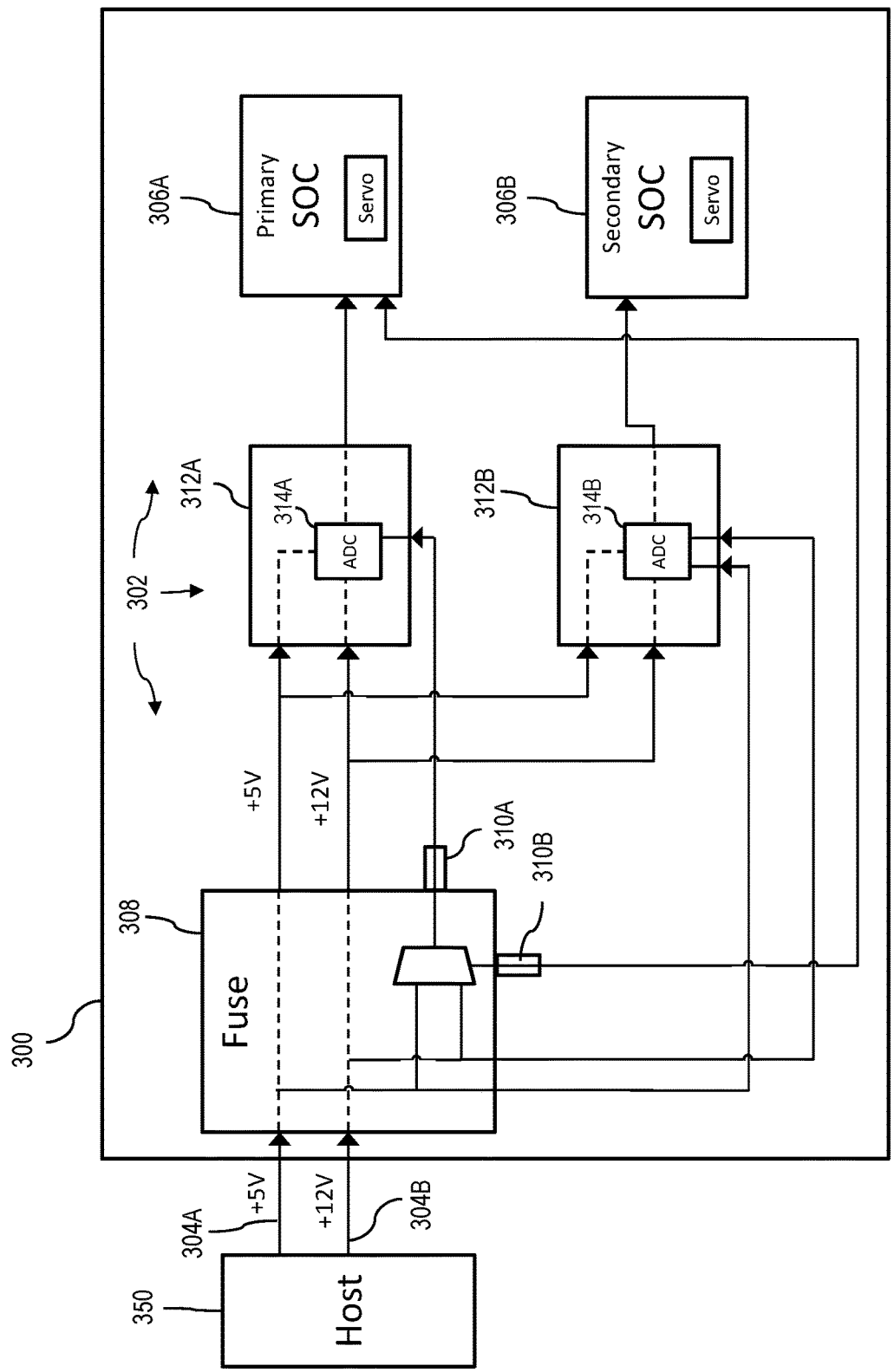
FIG. 3 shows a schematic of another power-calculating circuit, in accordance with certain embodiments of the present disclosure.

FIG. 3 shows a data storage device 300 with a power-calculating circuit 302 (hereinafter referred to simply as the "circuit 302") that can be used to calculate the total power usage of the data storage device 300. For simplicity of explanation, the data storage device 300 is not shown in FIG. 3 with all of the features described above with respect to FIG. 1 and vice versa. However, it is appreciated that the data storage device 300 could include each of the features shown and described with respect to FIG. 1 but not necessarily shown in FIG. 3. Similarly to the power-calculating circuit 202 of FIG. 2, the circuit 302 includes features for measuring the voltage being inputted to the data storage device 300 and for measuring the current being consumed by the electronics of the data storage device 300.

A host 350 is shown as providing two power sources (i.e., a first power source 304A and a second power source 304B) to the data storage device 300. In certain embodiments, the two power sources can have different voltages. For example, the first power source 304A can be a 5-volt power source and the second power source 304B can be a 12-volt power source. The first power source 304A can power components of the data storage device 300 such as first and second SOCs 306A and 306B as well as miscellaneous lower-power electronics while the second power source 304B can power components of the data storage device 300 such as the spindle motor, microactuators, and the voice coil motors that rotate actuators coupled to read/write heads.

The signals from both the first power source 304A and the second power source 304B can be inputted to a fuse 308. As mentioned above with respect to the fuse 110 of FIG. 1, the fuse 308 can help prevent low voltage levels from reaching the electronics of the data storage device or power from leaking out of the data storage device 300.

In certain embodiments, the fuse 308 is also configured to output multiple analog signals that are indicative of the current being used by the electronics of the data storage device 300 that are being powered by the respective first power source 304A and the second power source 304B. In certain embodiments, the outputted analog signal has a voltage that is proportional to the current being used by the electronics of the data storage device 300.

In certain embodiments, the fuse 308 shown in FIG. 3 includes multiple output pins (i.e., a first output pin 310A and a second output pin 310B). The first output pin 310A can be arranged to output a first analog signal indicative of the current being used by the electronics powered by the first power source 304A (e.g., from the first input voltage), and the second output pin 310B can be arranged to output a second analog signal indicative of the current being used by the electronics powered by the second power source 304B (e.g., from the second input voltage). In certain embodiments, the first output pin 310A and the second output pin 3106 include or are coupled to respective series resistor, which can be used to adjust the gain or scaling of the respective signals indicative of the current being used by the electronics powered by the first power source 304A (e.g., from the first input voltage) and by the electronics powered by the second power source 304B (e.g., from the second input voltage).

In certain embodiments, the first analog signal—that is indicative of the current being used by the electronics of the data storage device 300 powered by the first power source 304A—is outputted from the fuse 308 and inputted to a first power device 312A. A first analog-to-digital converter 314A of the first power device 312A can convert the analog signal to a first digital signal that can be used by the first SOC 306A. In certain embodiments, the first power device 312A includes a scaling module that scales down the amplitude of the signal being inputted to the first SOC 306A.

In certain embodiments, the second analog signal—that is indicative of the current being used by the electronics of the data storage device 300 powered by the second power source 304B—is outputted from the fuse 308 and inputted to a second power device 312B. A second analog-to-digital converter 314B of the second power device 312B can convert the analog signal to a first digital signal that can be used by the second SOC 306B. In certain embodiments, the second power device 312B includes a scaling module that scales down the amplitude of the signal being inputted to the second SOC 306B. Although the first power device 312A and the second power device 312B are shown are separate devices, they may be incorporated onto a shared chip package but with separate inputs and outputs.

After receiving the first digital signal indicative of the current being used by the electronics of the data storage device 300, the first SOC 306A uses the first digital signal and one of the input voltages to calculate the actual power being used by electronics powered by one of the power sources. Similarly, after receiving the second digital signal indicative of the current being used by the electronics of the data storage device 300, the second SOC 306B uses the second digital signal and the other one of the input voltages to calculate the actual power being used by electronics powered by the other one of the power sources. The two power calculations can be calculated by multiplying the respective known input voltages by the respective known currents, which are based on the digital signals indicative of the current being consumed by the electronics of the data storage device 300. In certain embodiments, a controller via a servo processor calculates the power. Although the first SOC 306A and the second SOC 306B are shown are separate devices, they may be incorporated onto a shared chip package but with separate inputs and outputs.

The first and second SOCs 306A and 306B can calculate the respective power being consumed by electronics of the data storage device 300 in real time by sampling the respective first and second digital signals from the power devices 312A and 312B and using the respective input voltages. The two power calculations can then be added together to calculate the total power usage of the data storage device 300. As will be described in more detail below, the power calculations can be used to determine when power is distributed from one power source to another.

Figure 4:
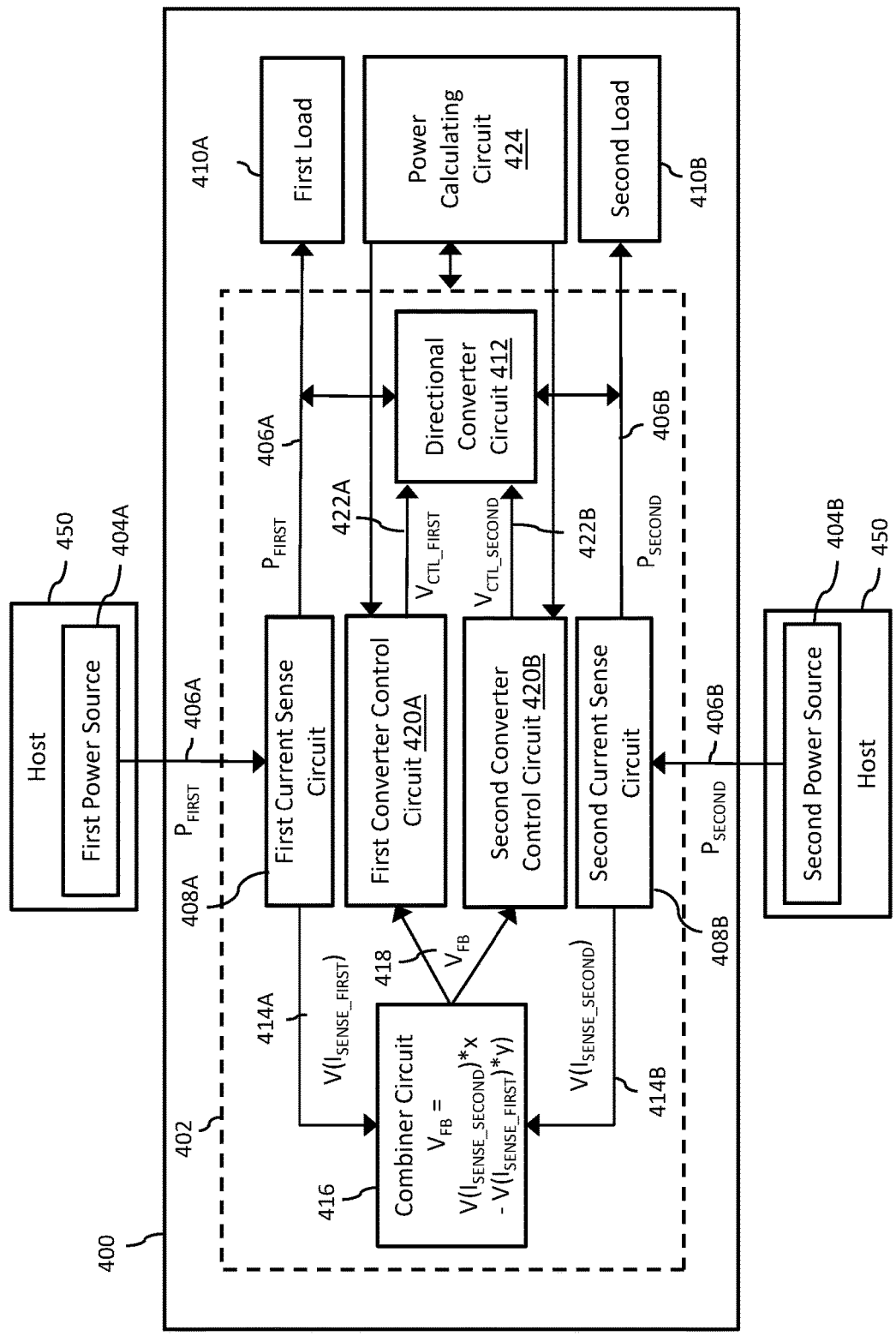
FIG. 4 shows a schematic of a load-sharing circuit, in accordance with certain embodiments of the present disclosure.

FIG. 4 shows a data storage device 400 with a load-sharing circuit 402 (hereinafter referred to simply as the "circuit 402") that utilizes power calculations such as the power calculations from the power-calculating circuits 202 and 302 described above. U.S. Pat. No. 10,199,833 describes further features of load-sharing circuitry and is herein incorporated by reference in its entirety. For simplicity of explanation, the data storage device 400 is not shown in FIG. 4 with all of the features described above with respect to FIGS. 1-3 and vice versa. However, it is appreciated that the data storage device 400 could include each of the features shown and described with respect to FIGS. 1-3 but not necessarily shown in FIG. 4.

In certain embodiments, the circuit 402 is part of a fuse (e.g., electronic fuse) such as the fuses described above. The fuse can also be configured to output analog signals that are indicative of the current being used by the electronics of the data storage device 400 that are being powered by the respective power sources. In certain embodiments, the outputted analog signals have voltages that are proportional to the current being used by the electronics of the data storage device 400.

The circuit 402 includes features for adjusting when power from one power source is used to supplement power from another power source. Put another way, power from a first power rail can supply power to a second power rail and vice versa. As will be described in more detail below, these adjustments can be based at least in part on power calculations from power-calculating circuits of the data storage device 400.

A host 450 is shown as providing two power sources (i.e., a first power source 404A and a second power source 404B) to the data storage device 400. To simplify the arrangement of the components of the circuit 402 in the rest of the figure, FIG. 4 shows two separate boxes for the host 450 although it is to be understood that only a single host may provide the two power sources. In certain embodiments, the two power sources can have different voltages. For example, the first power source 404A can be a 5-volt power source and the second power source 404B can be a 12-volt power source.

The first power source 404A can power components of the data storage device 400 such as integrated circuits as well as other miscellaneous lower-power electronics while the second power source 404B can power components of the data storage device 400 such as the spindle motor, microactuators, and the voice coil motors that rotate actuators coupled to read/write heads. In certain embodiments, the electronics powered by the first power source 404A are considered to be electrically coupled to the first power rail, and the electronics powered by second power source 404B are considered to be electrically coupled to the second power rail.

The first power source 404A can have an output to supply a first power signal, $P_{FIRST}$ 406A, to an input of a first current sense circuit 408A. The second power source 404B can have an output to supply a second power signal, $P_{SECOND}$ 406B, to an input of a second current sense circuit 408B.

The first current sense circuit 408A may have an output to provide the first power signal 406A to an input of a first load 410A and an input of a directional converter circuit 412. The directional converter circuit 412 may be single-directional (e.g., programmed to direct power one way) or bi-directional (e.g., programmed to directed power two ways). The second current sense circuit 408B can have an output to provide the second power signal 406B to an input of a second load 410B and an input of the directional converter circuit 412. The first load 410A and second load 410B may include one or more of electronic circuits and spindle motors as noted above. The first load 410A and the second load 410B may draw current at the same time, and an amount of current the first load 410A and second load 410B draw may vary independently. For example, the first load 410A may be a spindle motor in the data storage device 400, and the second load 410B may be a processor or controller in the data storage device 400. The spindle motor may consume more power when it spins up to an operating speed compared to when motor is at and is maintaining its operation speed, while a processor or controller may consume more current when larger quantities of data are processed than when less data are processed. Because the increase in the spindle motor's rotational velocity may be independent of the data processing of the controller, the current demand of the first load 410A may not be related to a change in the current demand of the second load 410B.

The first current sense circuit 408A may produce a first sense signal, $V(I_{SENSE\_FIRST})$ 414A, and have an output to provide the first sense signal 414A to an input of a combiner circuit 416. The second current sense circuit 408B may produce a second sense signal, $V(I_{SENSE\_SECOND})$ 414B, and have an output to provide the second sense signal 414B to an input of the combiner circuit 416. The first sense signal 414A and the second sense signal 414B may be voltage signal representations of current from the first power source 404A and the second power source 404B, respectively.

The first current sense circuit 408A and the second current sense circuit 408B may be current controlled voltage sources, current sensing field-effect transistors (FETs), sense amplifiers, isolation amplifiers, other circuits, current probes, or any combination thereof. In some examples, a current sensing FETs (sense FET) may be a power metal-oxide-semiconductor FET (MOSFET) that is constructed to route a portion of the current flowing between a drain and source terminal of a main transistor to a drain or source of a sense transistor.

The combiner circuit 416 may be a circuit that can produce a feedback signal, $V_{FB}$ 418, based on the first sense signal 414A and the second sense signal 414B. The combiner circuit 416 may be a summing circuit, such as an operational amplifier configured to combine two or more signals. In some embodiments, the combiner circuit 416 may be one or more analog-to-digital converters coupled to one or more processors. For example, analog-to-digital converters can convert the first sense signal 414A and the second sense signal 414B into digital signals. The processor(s) may receive the digital signals and perform a mathematical operation(s) on the digital signals to produce a digital feedback voltage. A data converter can convert the digital feedback voltage into $V_{FB}$ 418.

The combiner circuit 416 may have an output to provide the feedback signal 418 to an input of a first converter control circuit 420A and an input of a second converter control circuit 422B. The first converter control circuit 420A can produce a first control signal, $V_{CTL\_FIRST}$ 422A, based on the feedback signal 418, and can have an output to provide the first control signal 422A to an input of the bi-directional switching circuit 412. The second converter control circuit 420B can produce a second control signal, $V_{CTL\_SECOND}$ 422B, based on the feedback signal 418, and can have an output to provide the second control signal 422B to an input of the bi-directional switching circuit 412.

The directional converter circuit 412 can include switching circuits, such as relays, transistors, other switching devices, or any combination thereof. Switching circuits in the directional converter circuit 412 can be configured to form a low impedance current path between the first load 410A and the second load 410B to transfer a portion of the first power signal 406A to the second power signal 406B to compensate for a power demand of the second load 4108. The directional converter circuit 412 can also transfer a portion of the second power signal 406B to the first power signal 406A to compensate for a power demand of the first load 410A.

During operation, the first load 410A and the second load 4108 may draw current from the first power source 404A and the second power source 404B, respectively. The first current sense circuit 408A can sense an amplitude of a current corresponding to the first power signal 406A that is being supplied by the first power source 404A. The first current sense circuit 408A can produce the first sense signal 414A based on an amplitude of the current and provide the first sense signal 414A to the combiner circuit 416. Similarly, the second current sense circuit 408B can sense an amplitude of a current corresponding to the second power signal 406B. The second current sense circuit 408B can produce the second sense signal 414B based on the amplitude of the current and provide the second sense signal 414B to the combiner circuit 416.

The first current sense circuit 408A and second current sense circuit 408B may continuously update the first sense signal 414A and the second sense signal 414B, respectively. However, the first current sense circuit 408A and the second current sense circuit 408B may update their respective sense signals periodically, at intervals, upon detection of a trigger, or for other reasons. For example, the first current sense circuit 408A may detect a trigger from the first load 410A to start providing the first sense signal 414A when the current demands of the first load 410A change. In some cases, a processor or other circuitry may provide the first current sense circuit 408A with an indicator to start providing the first sense signal 414A. In some examples, the first sense signal 414A, the second sense signal 414B, or both, may represent an average value of an amplitude of their respective currents. For example, the first sense signal 414A can represent an amplitude of current corresponding to the first power signal 406A averaged over a period of time.

The combiner circuit 416 can combine the first sense signal 414A and the second sense signal 414B to produce the feedback voltage, $V_{FB}$ 418. In some embodiments, the feedback voltage 418 may be equal to $V(I_{SENSE\_Second})*X - V(I_{SENSE\_FIRST})*Y$. "X" and "Y" may be values selected to allow first power source 404A and the second power source 404B to deliver a desired amount power. For example, "X" and "Y" may be selected to allow an amount of power that can be delivered by both the first power signal 406A and the second power signal 406B to be 5 watts. In some cases, "X" and "Y" may correspond to a voltage of the second power source 404B and the first power source 404A, respectively.

The combiner circuit 416 can provide the feedback signal 418 to the first converter control circuit 420A. The first converter control circuit 420A can compare the feedback signal 418 to a load-sharing threshold. The load-sharing threshold may be a reference voltage, which may represent a regulation threshold corresponding to a regulation of current from the first power source 404A. The load-sharing threshold may be a hysteretic voltage, which may include a dc offset voltage and a triangle waveform signal. In some embodiments, the triangle waveform signal may be of fixed amplitude and frequency.

When the feedback voltage 418 is greater than the load-sharing threshold, the second load 410B may be demanding more current than the first load 410A. An amount of a voltage difference between the feedback voltage 418 and the hysteretic voltage may determine how much current can be provided to the second load 4106 from the first power source 404A to compensate for the current demand of the second load 4106. For example, more current may be provided when the feedback voltage 418 is 40 millivolts ("mV") higher than the hysteretic voltage as compared to when the feedback voltage 418 is 20 mV higher than the hysteretic voltage.

The first converter control circuit 420A can compensate for the current demand of the second load 410B by providing the first control signal 422A to the directional converter circuit 412. The bi-directional converter circuit 412 can transfer a portion of the first power signal 406A to the second power signal 406B in response to an amplitude of first control signal 422A. For example, when the first control signal 422A is above a certain level, a switching device (e.g., a transistor, a relay) can create a low impedance current path, which may allow current corresponding to the first power signal 406A to flow to the second load 410B.

The combiner circuit 416 can also provide the feedback voltage 418 to the second converter control circuit 420B, which can compare the feedback voltage 418 to a load-sharing threshold. The load-sharing threshold of the second converter control circuit 420B may represent a reference voltage, which may be a regulation threshold corresponding to a regulation of current from the second power source 404B and may be a hysteretic voltage. The hysteretic voltage of the second converter control circuit 420B may be different than the hysteretic voltage of the first converter control circuit 420A. When the feedback voltage 418 is less than the load-sharing threshold, the first load 106 may be demanding more current than the second load 410B. To compensate for the power demand of the first load 410A, the second converter control circuit 420B can provide the second control signal 422B to the directional converter circuit 412, which can provide a portion of the second power signal 406B to the first load 410A based on an amplitude of the second control signal 422B. For example, when the second control signal 422B is above a certain level, a switching circuit, such as a solid state switch, can be closed to create a low impedance current path between the second current sense circuit 408B and the first load 410A, thus allowing a portion of the second power signal 406B to be provided to the first load 410A.

As noted above, the first converter control circuit 420A and the second converter control circuit 420B compare the output of the combiner circuit 416 (e.g., the feedback voltage 418) to load-sharing thresholds to determine whether to cause the bi-directional converter circuit 412 to distribute current from one power rail to another. For example, if a given load-sharing threshold is breached, the directional converter circuit 412 may provide a portion of the second power signal 406B to the first power signal 406A or vice versa. Put another way, when a power demand on the first power source 404A exceeds a load-sharing threshold level, the directional converter circuit 412 can provide power from the second power source 404B to the electronics typically powered by the first power source 404A to compensate for a current demand on the first power source 404A, and vice versa.

For increased power efficiency, the lower-voltage power source (e.g., the first power source 404A rated at 5 volts in the example of FIG. 4) should be fully utilized rather than higher-voltage power sources (e.g., the second power source 404B rated at 12 volts in the example of FIG. 4). This is because power from lower-volt power sources is used more efficiently in data storage devices than power from high-voltage power sources. As such, the load-sharing thresholds for determining when power is distributed from one power rail to another can be set and/or modified to prefer power utilization of lower-voltage power sources over higher-voltage power sources. The load-sharing thresholds can be set and/or modified based on power calculations and comparison of the power calculations to power thresholds.

The data storage device 400 of FIG. 4 includes a power-calculating circuit 424. The power-calculating circuit 424 can be an SOC—such as the SOCs described above—that is configured to receive signals indicative of the current being used by electronics from the first power source 404A and the second power source 404B and the input voltages of the first power source 404A and the second power source 404B. The received signals (e.g., the input voltages and the signals indicative of the current) can be used to calculate power being used by the electronics of the data storage as described above. The power calculated by the power-calculating circuit 424 (e.g., the power consumed by electronics of the first power source 404A and the power consumed by electronics of the second power source 404B) can be compared to power thresholds within the power-calculating circuit 424. For example, a customer may require manufacturers of data storage devices to limit power consumption of the data storage devices and that limit may be expressed as the power thresholds. The comparison of the calculated power and the power thresholds can be used to modify the load-sharing thresholds.

The load-sharing thresholds for determining when power is distributed from one power source to electronics of another power source may be set in the factory. In the factory, these load-sharing thresholds may be set at conservative levels. For example, electronics of the data storage device 400 may consume more power when the data storage device 400 is operating in one environment (e.g., a high temperature environment) than when the data storage device 400 is operating in another environment (e.g., a lower temperature environment). To provide tolerances, the load-sharing thresholds may be set so that the data storage device 400 does not consume too much power in the higher-power environment. With these tolerances, in the lower-power environment, the load-sharing thresholds may be set so that power from a more-efficient power source is under-utilized.

As such, the load-sharing thresholds can be modified in response to calculations of actual power use and the comparison of the calculated power to power thresholds. For example, the load-sharing thresholds can be modified so that the lower-voltage power source is fully utilized before power from the higher-voltage power source is distributed to (e.g., shared with) the lower-voltage power rail. More specifically, if the calculated power consumed from the first power source 404A is less than the power threshold (e.g., 1.4 amperes) of the first converter control circuit 420A, the load-sharing thresholds can be increased so that more current from the lower-voltage power source is provided to the data storage device 400. Similarly, the power threshold can be lowered if the calculated power is too great. In certain embodiments, the load-sharing thresholds are stored in a register in the circuit 402 and modified in response to receiving a command from the power-calculating circuit 424.

FIG. 5 outlines a method 500 for monitoring power of the data storage device 100. The method 500 includes calculating a first power amount being consumed by a first set of electronics powered by a first source (block 502 in FIG. 5). The method 500 further includes calculating a second power amount being consumed by a second set of electronics powered by a second source (block 504 in FIG. 5). The method further includes distributing current from the first source and the second source based at least in part on the calculated first power (block 506 in FIG. 5).

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A data storage device comprising:
   load-sharing circuitry configured to utilize a threshold for distributing current from multiple sources and modify the threshold in response to a calculated power;
   a fuse configured to output a signal indicative of current being inputted to the data storage device from the multiple sources; and
   power calculating circuitry configured to calculate, based at least in part on the signal, power used from the multiple sources for use by the load-sharing circuitry.

2. The data storage device of claim 1, wherein the load-sharing circuitry is configured to distribute the current between a first power rail and a second power rail.

3. The data storage device of claim 2, wherein the first power rail is a 12-volt power rail, wherein the second power rail is a 5-volt power rail.

4. The data storage device of claim 3, wherein the first power rail is electrically coupled to a spindle motor, wherein the second power rail is electrically coupled to an integrated circuit.

5. The data storage device of claim 1, wherein the threshold is modified to maximize power usage of one of the multiple sources.

6. The data storage device of claim 1, wherein the threshold is modified to optimize power efficiency of the data storage device.

7. The data storage device of claim 1, wherein the signal indicative of the current comprises a voltage that is proportional to the current being inputted to the data storage device.

8. The data storage device of claim 1, wherein the load-sharing circuitry includes:
   a single- or bi-directional converter circuit configured to distribute the current, based at least in part on the modified threshold, from one of the multiple sources to a load coupled to another one of the multiple sources.

9. The data storage of claim 1, further comprising a power device electrically coupled between the fuse and the power calculating circuitry, the power device comprising an amplifier and configured to manage power distribution to electronics of the data storage device.

10. The data storage device of claim 9, wherein the power device includes an analog-to-digital converter configured to convert the signal from an analog signal to a digital signal.

11. A method comprising:
    receiving, by an electrical connector, an input voltage to power electronics of a data storage device;
    receiving the input voltage by a fuse electrically coupled between the electrical connector and the electronics;
    outputting, by the fuse and based on the input voltage received by the fuse, a signal indicative of current being inputted to the data storage device;
    calculating, based at least in part on the signal, a first power amount being consumed by a first set of the electronics powered by a first source;
    calculating, based at least in part on the signal, a second power amount being consumed by a second set of the electronics powered by a second source; and
    distributing current between the first source and the second source based at least in part on the calculated first power.

12. The method of claim 11, wherein the distributing current between the first source and the second source is based at least in part on comparing the calculated first power to a first power threshold.

13. The method of claim 12, wherein a load-sharing threshold is modified based at least in part on a comparison of the calculated first power and the first power threshold.

14. The method of claim 11, wherein the distributing current between the first source and the second source is based at least in part on the second calculated power.

15. An electronic fuse comprising:
    a first input of the electronic fuse configured to receive a first voltage signal from a first power source;
    a second input configured to receive a second voltage signal from a second power source;
    an output configured to communicate a first analog signal indicative of a first current being inputted to a data storage device from the first voltage signal;
    a single- or bi-directional converter circuit configured to distribute current, based at least in part on a control signal, from the first power source to a load coupled to the second power source; and
    a converter circuit configured to receive a command signal that is responsive to a calculated power that is based at least in part on the first analog signal and the first voltage signal.

16. The electronic fuse of claim 15, wherein the converter circuit is configured to modify a load-sharing threshold in response to a comparison of a power threshold and the calculated power.

17. The electronic fuse of claim 16, wherein the load-sharing threshold is modified to maximize use of the current received from the first power source.

18. The electronic fuse of claim 17, wherein the first voltage signal has an amplitude that is lower than an amplitude of the second voltage signal.

19. The electronic fuse of claim 15, wherein the first analog signal comprises a voltage that is proportional to the current being inputted to the first input.

20. The electronic fuse of claim 15, wherein the output is a single output pin arranged to communicate interleaved respective signals indicative of the current being inputted to the data storage device from the first voltage signal and from the second voltage signal.

* * * * *